United States Patent [19]

Van As et al.

[11] Patent Number: 5,276,682
[45] Date of Patent: Jan. 4, 1994

[54] MEDIUM ACCESS TECHNIQUE FOR LAN SYSTEMS

[75] Inventors: Harmen Van As, Langnau; Wolfram Lemppenau, Kilchberg, both of Switzerland

[73] Assignee: International Business Machines Corporation, Armonk, N.Y.

[21] Appl. No.: 807,344

[22] Filed: Dec. 16, 1991

[30] Foreign Application Priority Data

Mar. 27, 1991 [EP] European Pat. Off. ......... 91810224.5

[51] Int. Cl.$^5$ .......................... H04J 3/16; H04L 12/42
[52] U.S. Cl. .................................. 370/85.5; 370/85.7; 370/85.15; 370/94.1; 340/825.05
[58] Field of Search ............ 370/16, 85.1, 85.2, 370/85.3, 85.4, 85.5, 85.6, 85.9, 85.11, 85.12, 85.15, 94.1, 85.7, 16.1, 95.1; 340/825.05, 825.5, 825.51

[56] References Cited

U.S. PATENT DOCUMENTS

| | | | |
|---|---|---|---|
| 4,977,557 | 12/1990 | Phung et al. | 370/85.6 |
| 5,001,707 | 3/1991 | Kositpaiboon et al. | 370/85.6 |
| 5,038,346 | 8/1991 | Courtois | 370/94.1 |
| 5,038,347 | 8/1991 | Courtois | 370/94.1 |
| 5,124,981 | 6/1992 | Golding | 370/85.6 |
| 5,157,657 | 10/1992 | Potter et al. | 370/85.6 |
| 5,214,649 | 5/1993 | Van As et al. | 370/85.7 |

FOREIGN PATENT DOCUMENTS

| | | |
|---|---|---|
| 0388574 | 9/1990 | European Pat. Off. |
| WO86/03639 | 6/1986 | World Int. Prop. O. |

OTHER PUBLICATIONS

R. M. Newman et al., "The QPSX Man", IEEE Communications Magazine, vol. 26, No. 4, Apr. 1988, U.S. pp. 20-28.

M. K. Karol et al., "High Performance Optical Local and Metropolitan Area Network Enhancements of FDDI and IEEE 802.6 DQDB", IEEE Global Telecommunications Conference, vol. 2, Nov. 1989, Dallas, U.S., pp. 1004-1011.

*Primary Examiner*—Benedict V. Safourek
*Assistant Examiner*—Alpus H. Hsu
*Attorney, Agent, or Firm*—Joscelyn G. Cockburn

[57] ABSTRACT

In a communication system comprising several nodes and a scheduler interconnected by a serial transmission medium, data are transmitted in time slots. The scheduler marks time slots either as reserved if nodes have previously made a request and received a confirmation, or it marks time slots as gratis for free use by any node. Slots are also marked gratis if the have reached their destination or removal node. To achieve fairness between nodes in the reservation process, they count gratis slots they used. When making a request for reserving a number NR of slots, a node must also transmit the number NG of gratis slots used. The scheduler then determines, according to a given rule, the number NC of slots to be granted for each node. A special signalling technique is also disclosed for effective transmission of the numbers in the reservation and confirmation process.

9 Claims, 10 Drawing Sheets

FIG. 1

NETWORK STRUCTURE AND
RESERVE/CONFIRM PROCEDURE

A) RESERVE          B) CONFIRM

FIG. 2
BASIC SLOT FORMAT

FIG. 3
DETAILS OF SLOT HEADER
(START DELIMITER/CONTROL FIELD)

FIG. 4
NODE STRUCTURE

FIG. 5
CONCEPT OF ROUND

FIG. 6
CIRCULATION OF RESERVE AND
CONFIRM COMMAND (INSERT/REMOVE)

FIG. 6A
RESERVATION

FIG. 6B
CONFIRMATION

FIG. 9
CIRCULATION OF SLOT

FIG. 10
HISTORY OF SLOT DURING CIRCULATIONS

MEDIUM ACCESS TECHNIQUE FOR LAN SYSTEMS

BACKGROUND OF THE INVENTION

1. Field of the Invention

Present invention is concerned with regulation of access to the transmission capacity in a communication system comprising several nodes and a scheduler interconnected by a transmission medium in which transmitted information sequentially passes the scheduler and nodes, such as in ring systems or recirculating bus systems. In particular, the invention is applicable to systems in which data are transmitted by insertion into time slots, and in which reservation for time slots is made upon previous request by nodes.

2. Description of Related Art

Such systems are known e.g. from European patent application No. 0,388,574 entitled "Method and Apparatus for Distributed Queue Multiple Acces in a Communication System" or European patent application No. 0,393,293 entitled "Method and Apparatus for Cyclic Reservation Multiple Access in a Communication System". The system described in EP-A-0,393,293 is a dual-bus system in which a reserve command is issued for each of several consecutive cycles by a header station, each node requiring access amends a reservation count in this command, and stores in a local queue the number of slots it requested for that cycle. The header station receives the total number of slots requested and checks whether this can be granted. If yes, it sends a confirm command to all nodes and enters the respective slot count (and cycle number) into a global queue. Later, it issues a corresponding number of slots after start of that cycle, and each node knowing how many slots it had reserved can use the respective number of free slots.

If the accumulated request arriving at the header cannot be granted, a general cancel command is issued so that nodes must also cancel the respective reservations. A partial or selective grant is not provided.

In such systems, techniques may be introduced to reuse slots when they have served the communication for which they were reserved, but the traffic situation and location of nodes will give them different opportunities to use this additional transmission capacity.

It would be desirable to have a reservation and grant mechanism which allows a node individual handling, which automatically adapts to the current traffic situation, and which requires a minimum of overhead.

SUMMARY OF THE INVENTION

The invention contemplates a communication system having a scheduler and a plurality of nodes connected to a circulating sequential transmission medium in which data or signals are transmitted in time slots issued by the scheduler as reserved or gratis. Nodes can use any free gratis slots for the transmission of data but can only use a reserved slot when authorized by a confirmed slot reservation issued by the scheduler in response to requests by a node. The requests are accompanied by count of the slots required and a count of the number of gratis slots used within a predetermined time period.

It is an object of present invention to devise, for a communication system comprising several nodes and a scheduler interconnected by a sequential transmission medium, and in which data are transmitted in fixed-format time slots which can be either reserved or gratis, a slot reservation mechanism which allows node-individual handling and which ensures that all nodes get a fairly balanced chance to transmit, depending on their demands.

The invented system and method have the following advantages: Slot requests can be selectively granted on a node-individual basis, but the scheduler need not know the identities of the nodes involved. Available gratis slots can be used freely to allow maximum utilization of transmission capacity, but when slot reservations are requested by nodes, the previous transmission chances which any node had are considered in the grants. The scheduler needs not to collect and keep information on current source-destination patterns of traffic, but can rely on information received in the reserve commands. The reservation and confirm signalling needs a very low portion of the transmission capacity, and nodes do not have to make signalling information changes on the fly requiring immediate calculations, but only have to insert or remove reserve and confirm numbers.

These and other advantages will become apparent from an embodiment of the invention which is described in the following with reference to drawings.

BRIEF DESCRIPTION OF THE DRAWINGS

FIG. 6 consists of (FIGS. 6A and 6B) shows the circulation of a reserve and confirm command and their modifications due to insertion and removal of information by the nodes;

FIG. 10 consists of (FIGS. 10A, 10B, 10C) shows examples of slot status modifications during several circulations of one slot around the ring.

DESCRIPTION OF THE PREFERRED EMBODIMENT

1) System, Data, and Node Structure

Figure 1:
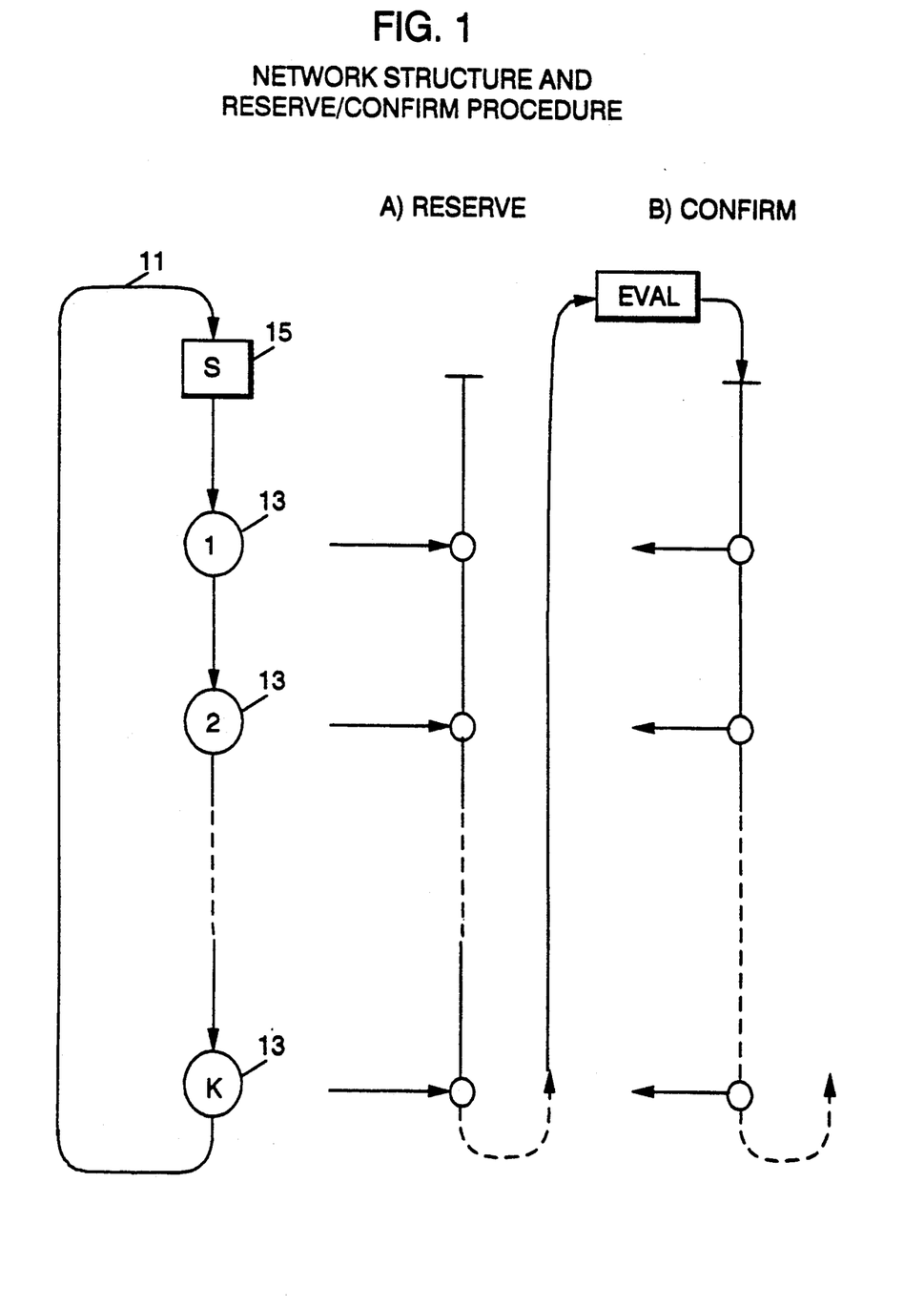
FIG. 1 is a schematic representation of the network structure and further shows, in connection with this structure, the path of a reserve and a confirm command.

An implementation of the invention is described in the following for a ring communication system whose structure is shown in FIG. 1. The transmission medium is a closed unidirectional ring (11) to which several nodes or stations (13) which are numbered 1 through K are connected; furthermore, a scheduler S (15) is provided. It should be noted here already that the invention can also be used in other communication system configurations such as dual-bus systems or similar systems in which information which started at a scheduler or header station, after sequentially passing several nodes, can be recirculated (retransmitted) via a single bus to the initial scheduler (header).

Figure 2:
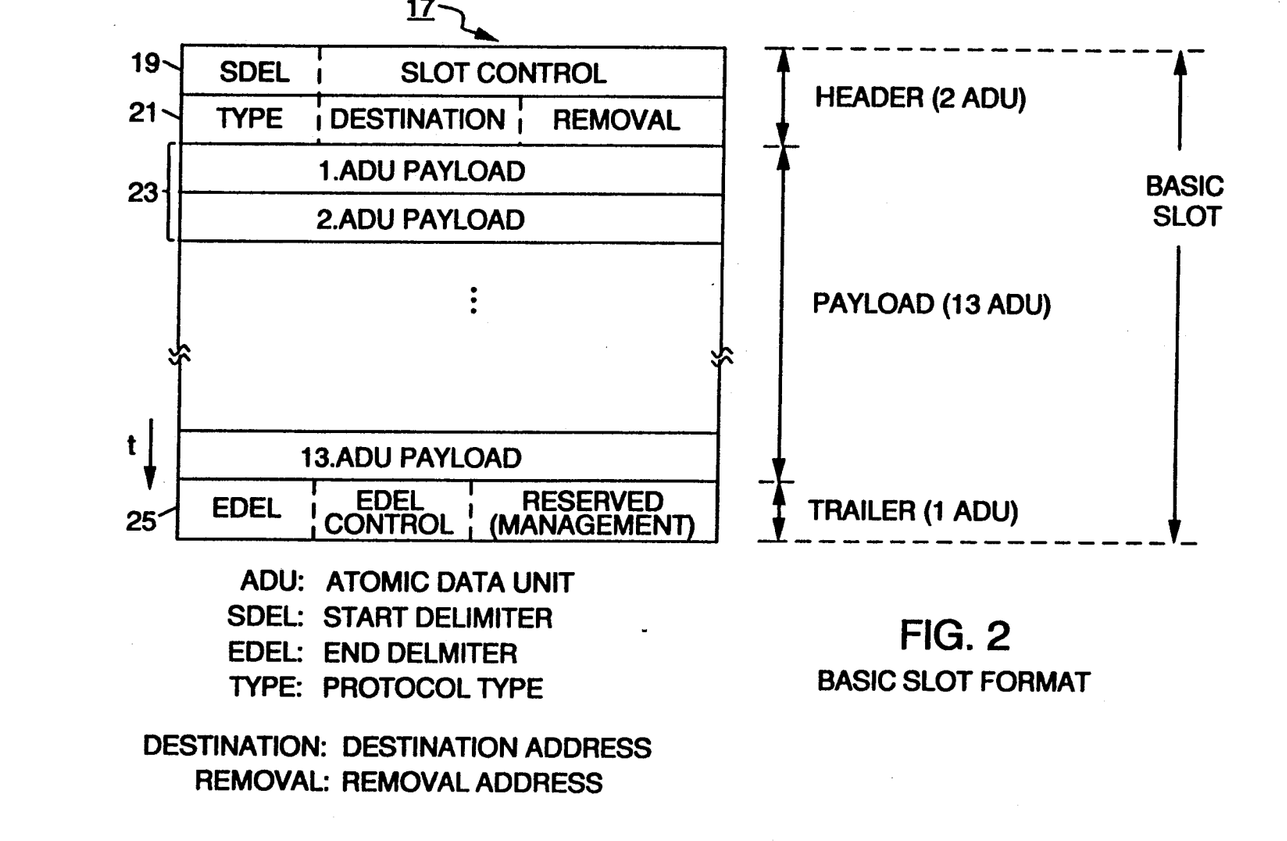
FIG. 2 represents the basic slot format for data transmission in the network.

The basic data transmission format on the transmission ring is a time slot having e.g. a structure as shown in FIG. 2 and is called a basic slot (17). Each basic slot is a sequence of Atomic Data Units (ADUs). An ADU is the smallest unit of information which is handled as a whole. It may e.g. consist of 32 bits because the data path and logic units in the circuitry used in the system provide for the handling of 32 parallel bits.

The basic slot consists of e.g. 16 sequential ADUs which are arranged as a slot header comprising 2 ADUs (19, 21), a data payload comprising 13 ADUs (23), and a trailer consisting of 1 ADU (25). The header begins with the start delimiter and further contains various control information. The payload just carries the data to be transmitted by the slot. The trailer begins with the end delimiter and carries some further control information.

Figure 3:
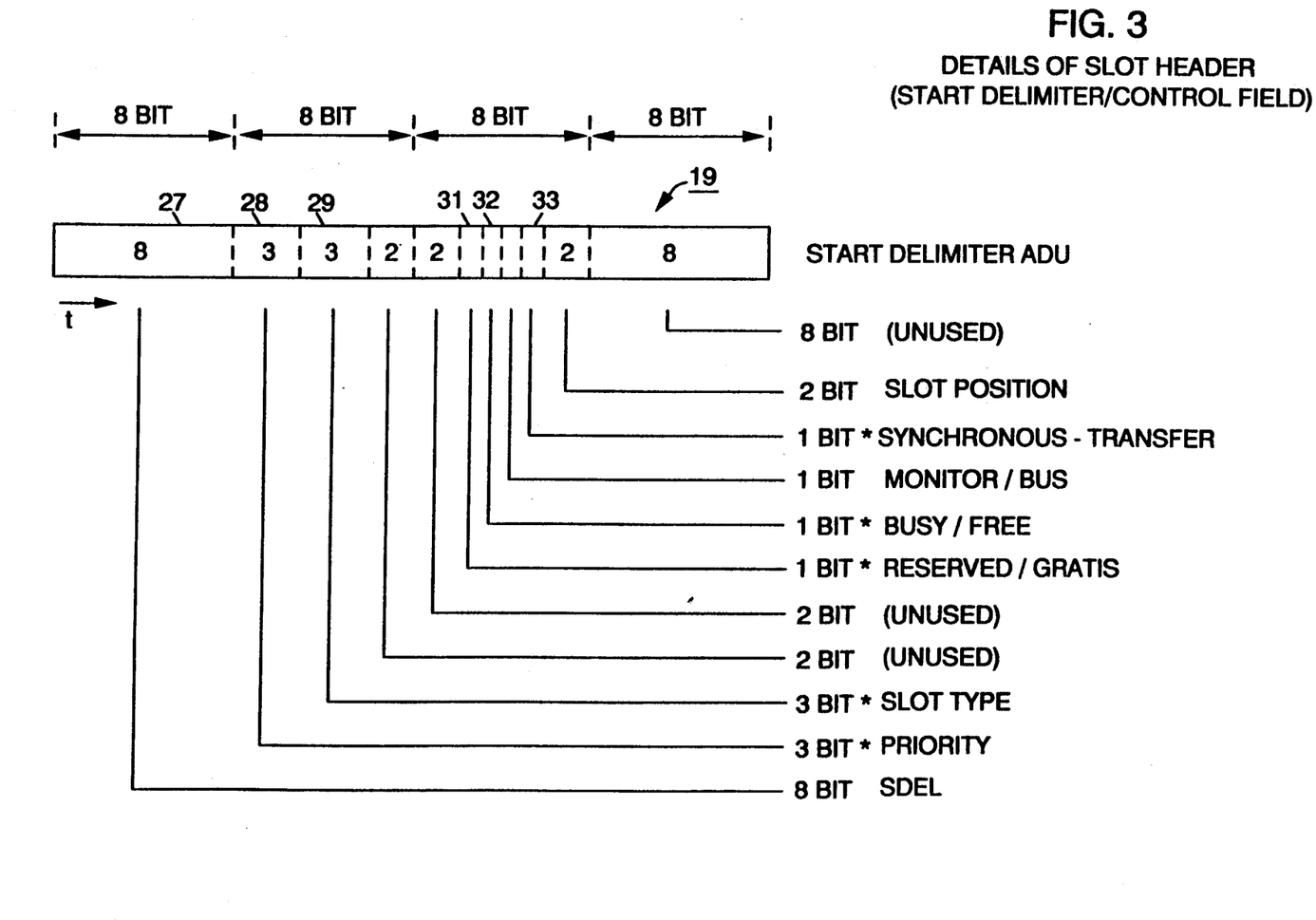
FIG. 3 shows details of the header of the slot format of FIG. 2, including a control section with several fields for control information relevant for present invention.

FIG. 3 shows some more detail of the control information carried in the slot header (first ADU). The first eight bits (27) are the start delimiter, as was already mentioned. Next, three bits (28) indicate the priority to allow the same types of operations and transmissions to be carried out separately for eight different priority classes. Three bits (29) indicate the slot type, i.e. whether the slot is for synchronous information, asynchronous information, etc. The next two 2-bit groups are not used in the present example. One bit (31) indicates whether the slot is RESERVED or GRATIS (to be explained later), a further bit (32) indicates whether the slot is BUSY or FREE (i.e. whether it carries valid data or not). Finally, there are a Monitor/Bus bit; a Synchronous-Transfer bit (33); and two bits for indicating first/middle/last/single slot position (for frames using several slots). The last eight bits are unused in present case. The most relevant control bits for the present invention are marked in FIG. 3 by an asterisk.

Figure 4:
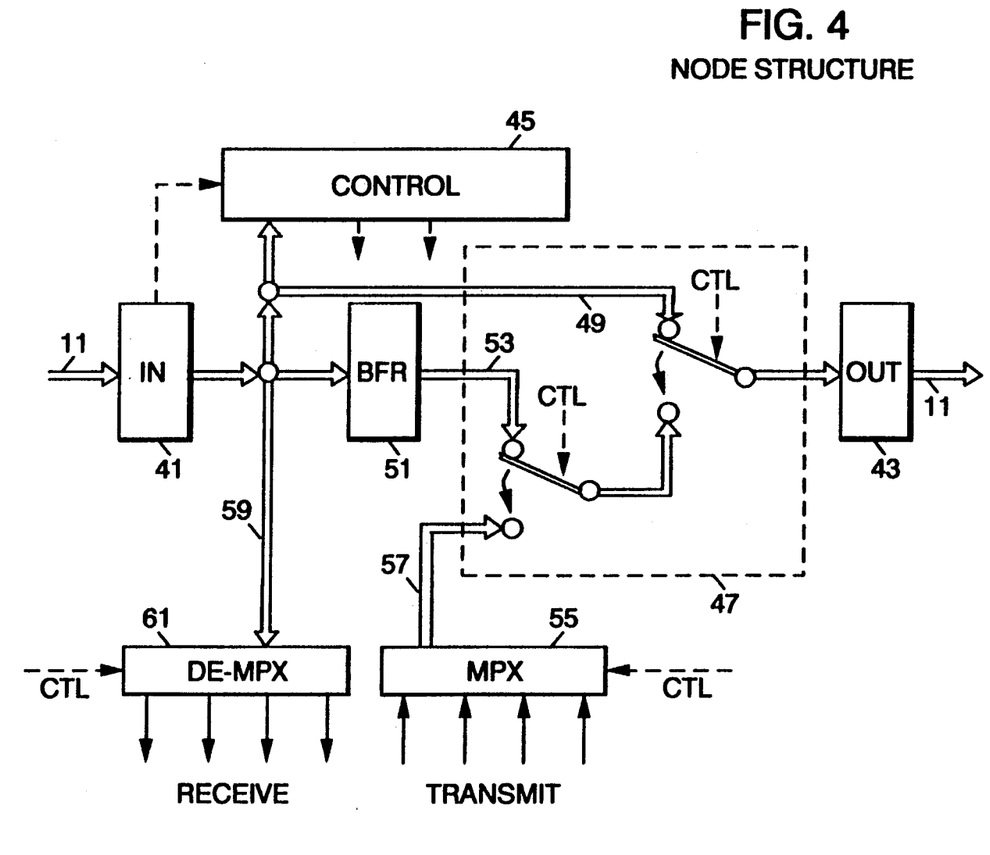
FIG. 4 is a block diagram of the node structure provided in the communication system.

The structure of the principal data paths in a node are illustrated in FIG. 4. The node comprises input circuitry 41 and output circuitry 43 connecting it to the incoming and outgoing portions of the transmission ring 11. A control 45 evaluates incoming data and the current status of the node to generate control signals for the various portions of the data paths. Multiplexer (or switching) circuitry 47 selects one of plural data paths for transferring data to the transmission ring.

There are four principal path for the data. A direct path 49 allows to directly transfer incoming data to the output circuitry (e.g. for synchronous data). An insert buffer 51 is provided for temporarily storing arriving data which can be released later to the ring via path 53. Local data of the node which have to be transmitted and may be stored in several transmission (output) buffers can be selected by multiplexer circuitry 55 for transfer to the output multiplexer via path 57. Incoming data which are to be received by the node can be transferred via a path 59 through a demultiplexer (switching means) 61 to several buffers or local units in the node.

2) Transmission Organization and Reservation Technique

Figure 5:
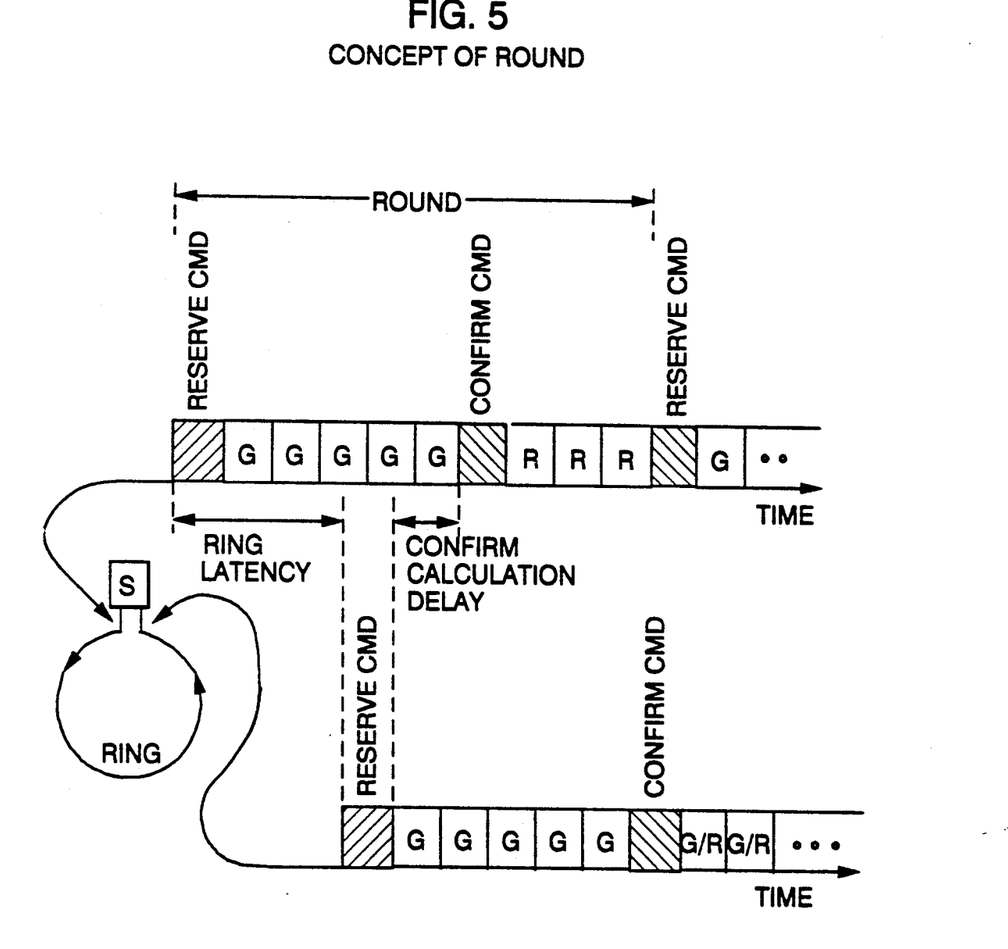
FIG. 5 illustrates the sequence of reserve commands, transmission slots, and confirm commands as they leave and enter the scheduler, and the length of a reservation round.

FIG. 5 illustrates how slot reservation and slot marking by the scheduler are organized. (Cf. also FIG. 1, right hand portion = A) Reserve and B) Confirm). Initially, the scheduler releases a Reserve command into which each node requiring slots for data transmission can enter its request (reservation). While the Reserve command circulates on the ring, the scheduler transmits gratis slots which can be used (if free) by any node without previous reservation. When the Reserve command returns to the scheduler, the information is evaluated to determine whether all or only a portion of the slot requests can be granted. Details will be described later. When the scheduler has finished its calculation, it releases a Confirm command to inform all nodes how many slots were granted and will be reserved for the requesting nodes. Immediately after the Confirm command, the scheduler starts to mark slots as reserved; the number of reserved slots corresponds to the total number of confirms given in the Confirm command. Each node will know, from the Confirm command, how many of the reserved slots it may use.

Because of the wrap-around effect in rings, the scheduler sees free gratis slots, busy gratis slots, and free reserved slots. All gratis slots (either free or busy) passing the scheduler are marked by the scheduler as reserved as long as reservations are required.

The scheduler maintains a "current length" count CL indicating how many reserved slots have still to be marked in the current round. The current length counter CL is decreased for every slot marked from gratis to reserved. Free reserved slots pass the scheduler without counter decrease. Free reserved slots arriving at the scheduler occur when busy reserved slots become free and only the upstream nodes (between scheduler and the node removing the slots) have confirmed reservations.

Thereafter, the scheduler sends out the next Reserve command. The interval between the issuance of two Reserve commands is called a "round". Rounds may be of different lengths, depending on the transmission demands of the nodes. No transmission capacity is wasted during the Reserve command circulation and during confirm calculation because of the transmission of gratis slots during that time. Though the issuance of a next Reserve command in present preferred embodiment is immediately after issuance of the necessary number of reserved slots, any other timing of the Reserve commands is of course possible, as will be explained in the last section (alternatives).

3) Reserve/Confirm Command Insertion/Signalling

Signalling, i.e. Reserve command transmission could be done in specific portions of each slot header, as was suggested in various previous systems. However, another technique is used in present embodiment. It is explained with reference to FIG. 6. When the scheduler wants to issue a Reserve command, it releases a Start flag (Start-of-Reserve SOR) immediately followed by an End flag (End-of-Reserve EOR). These two flags are inserted in the data stream between two successive slots, as is shown in FIG. 6 (buffer insertion technique). Each node desiring to reserve slots, waits for a SOR flag to come, and inserts its reserve field (RES) before the EOR flag. Thus, during its circulation, the Reserve command grows until it has accumulated all nodes' reserve, cf. FIG. 6. Both flags and also each reserve field have exactly the size of one Atomic Data Unit ADU.

For granting reserved slots to the nodes, the scheduler will issue a Confirm command of exactly the same structure, i.e. having a start flag (SOC), several confirm fields (CON), and an end flag (EOC).

This signalling technique allows immediate insertion of signalling information whenever necessary, without wasting any transmission capacity. It is termed "insert-/remove signalling".

Figure 6A:
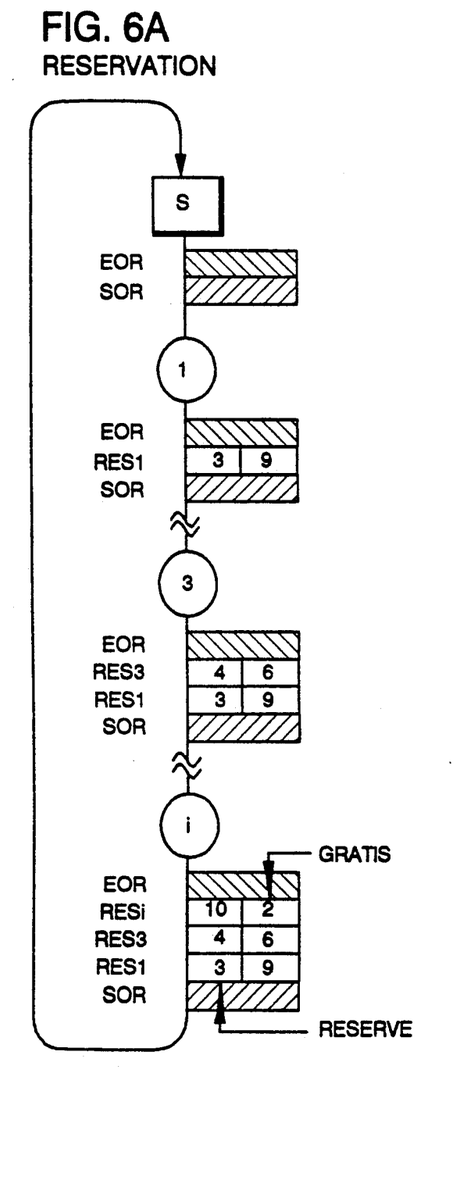
Figure 6B:
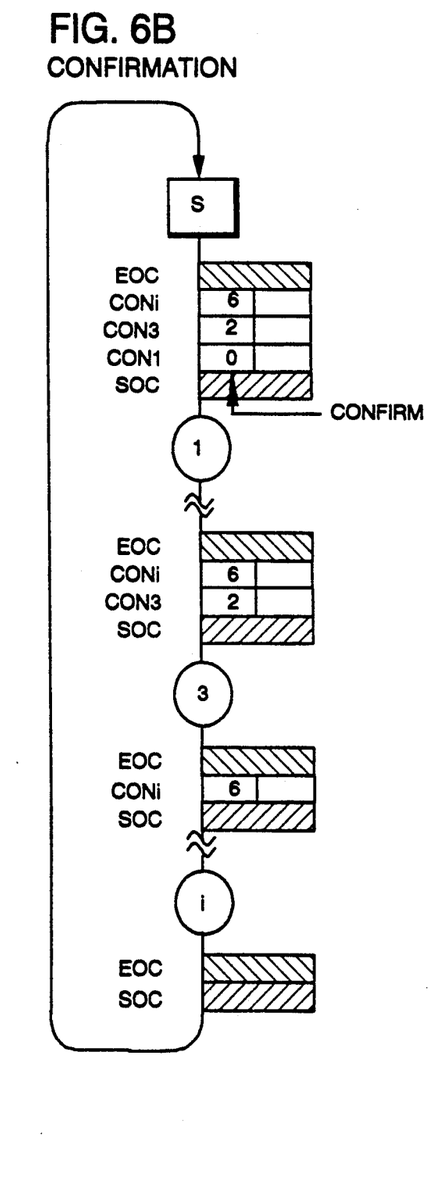

Details of Reserve command handling and transmission, and of Confirm command transmission are explained in the sequel with reference to FIGS. 6A and 6B. FIG. 6A shows the circulation and growing of one Reserve command. After the scheduler, there are only the Start and End flag SOR and EOR. Node 1 inserts its reservation (RES1) for 3 slots between the two flags, i.e. a "3" (the second number serves a purpose to be explained later). Node 2 which does not require transmission forwards the Reserve command unchanged. Node 3 inserts its reservation (RES3) for 4 slots between the last reserve field and the End flag. Finally, a node i inserts its reservation request (RESi) for 10 slots, and the scheduler receives the accumulate Reserve command train as shown in the bottom of FIG. 6A. The scheduler knows how many slots each node has requested, and can determine the slots to be granted in the respective round. Details of the algorithm and of the "gratis" slot slot counts with each reserve field will be explained below.

The scheduler then issues a Confirm command which has the same structure and the same number of fields as the Reserve command: A start flag SOC, followed by several confirm fields CON1, CON3, CONi, and an End flag EOC. Each node which previously made a request now extracts the first confirm field from the command and stores the respective number (e.g. a 0 in node 1) and eliminates the respective confirm field from the command. The command diminishes during its circulation until only the Start and End flag return to the scheduler which will eliminate them.

This procedure allows a node-individual handling of requests and grants, without the necessity for the scheduler to identify the nodes involved. Thus, a fine tuning of traffic/grants and a fair handling of all nodes is possible.

Rules for Insertion and Remove Operations in the Reservation Process

1) Scheduler Sends Reserve Command

The issued Reserve command consists initially only of two ADUs (start flag ADU, and end flag ADU). When they are inserted, two ADU's of the data stream must be stored (delayed) in an insertion buffer of the scheduler. From now on, the data path in the scheduler becomes longer by two ADUs until that buffer is emptied again.

2) Reserve Command Arrives at a Node

Every node having requests will insert its reserve field ADU, requiring that one ADU from the data stream must be stored (delayed) in an insertion buffer of the node. Now, all data is delayed in that node by one ADU until the insertion buffer is emptied again.

3) Reserve Command Returns to Scheduler

The scheduler receives the Reserve command and can eliminate from its insertion buffer two ADUs (caused by Start/End). All other Reservation ADUs travel further on the medium as idle ADUs (causing a temporary gap).

4) Scheduler Issues the Confirm Command

After processing of the Reserve command, which may take a time corresponding to several slots, the scheduler inserts the Confirm command, delaying incoming slot ADUs correspondingly in its insertion buffer. Apart from Start flag and End flag the amount of ADUs is the same as the gap of idle ADUs currently on the medium.

5) Confirm Command Arrives at a Node

Every node which previously made a request removes its confirm field ADU and empties also its insertion buffer.

6) Gap of Idle ADUs Returns to Scheduler

When the gap of idle ADUs (remainder of the circulated Reserve command) returns to the scheduler the corresponding number of ADUs contained in the insertion buffer (because of inserting the Confirm command) can be removed.

7) Confirm Command Arrives at Scheduler

Finally, when the Confirm command returns to the scheduler it consists now only of two ADUs (Start and End flag), so that now the last two ADUs in the insertion buffer of the scheduler can be removed. From this moment on, all ADU delays on the medium caused by the reservation process are eliminated.

4) Special Fairness Technique

According to present invention, a special technique for achieving fairness between nodes is employed. This is based on an evaluation of the gratis slots which a node has used in any round. As can be remembered, the scheduler transmits in each round a number of gratis slots which can be used by any node without reservation. The provision of gratis slots helps to improve system performance, but due to the fact that nodes immediately downstream of the destination nodes more often see gratis slots will introduce unfairness. An accounting of gratis slot usage is introduced by a special technique disclosed herewith for correcting this unfairness. The correction is done by taking into consideration the number of gratis slots a node could use during the previous (reservation) round. Depending on the current source-destination matrix, the nodes have different opportunities to use gratis slots. Therefore, only those nodes which have been penalized by a temporarily unfavorable position must be promoted to obtain their fair throughput share.

Figure 7:
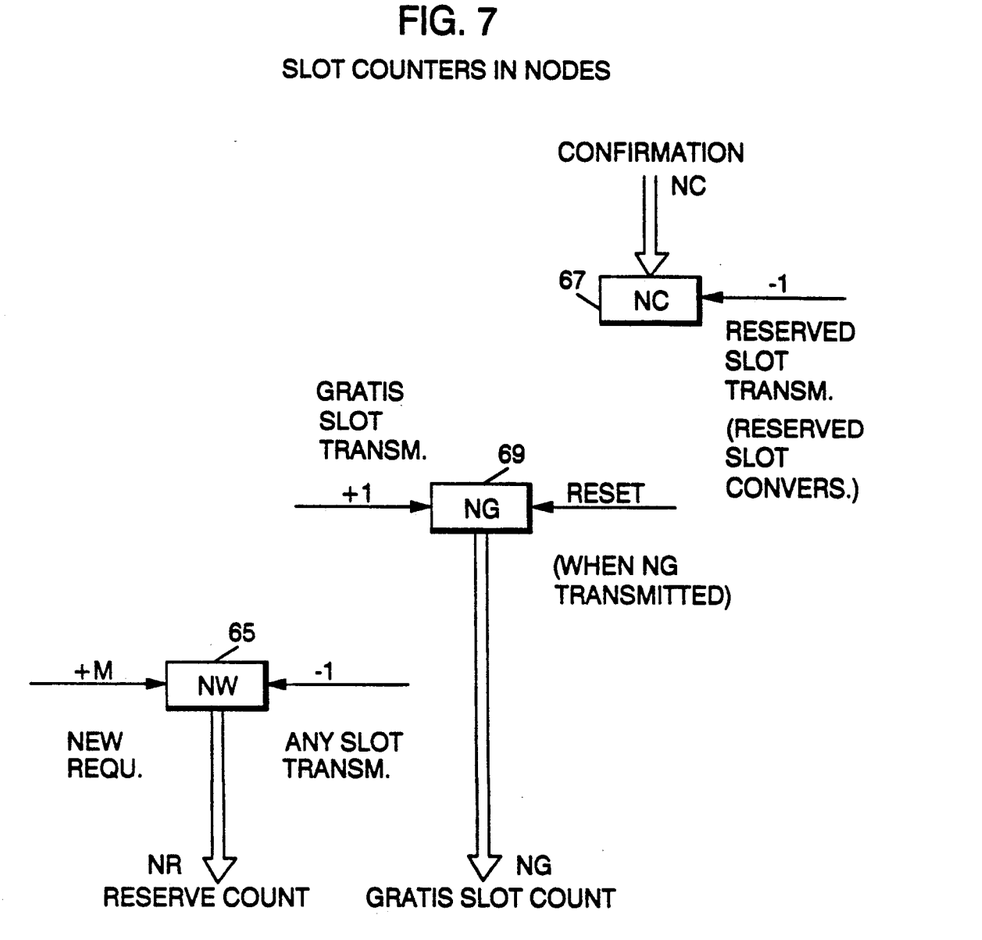
FIG. 7 shows three counters provided in each node for executing the invention, and their input and output information.

FIG. 7 shows three different counters which are provided in each node. There is a first counter 65 for a number NW, representing the number of slots which are waiting for transmission. Whenever there is a request in the node for transmission of a packet or message consisting of M slots, the respective number M is added to the contents of this counter. Whenever local data are transmitted in a slot, number NW is decreased by one. There is a second counter 67 for a number NC representing the number of confirmed slots. Whenever the active node receives a confirm field with a Confirm command (i.e. after it had made a reservation request), the number will be stored as NC in this counter. When the node makes a transmission in a reserved slot, it decreases the number NC by one unit. Another reason for decreasing this number is explained below. When a zero is stored in this counter, the node must not use any more reserved slots.

In case that a node still has confirmed reservations when the node has no more data to send, the node changes a free reserved slot into a free gratis slot and decreases its confirmed number of reservations NC by one. This happens when the node had used gratis slots to transmit all or part of its data.

An additional counter 69 stores a number NG, the count of gratis slots used. This will be utilized for the fairness procedure presently explained. The number is increased by one whenever the node uses a free gratis slot for data transmission. When a Reserve command arrives, the node inserts not only the number NW as reserve count NR for requesting the respective number of slots, but also the number NG as gratis slot count, thus admitting, simultaneously with requesting reserved slots, how many gratis slots it had used in the previous round. Contents of the NG counter is then reset to zero.

Both numbers, i.e. the reserve count and the gratis slot count, are inserted into the same reserve field (ADU) of the Reserve command, as is shown in FIG. 6A. How the confirmation is computed from the information (numbers) received by the scheduler with the Reserve command, is disclosed in the next section.

Computation of Confirm Numbers

Figure 8:
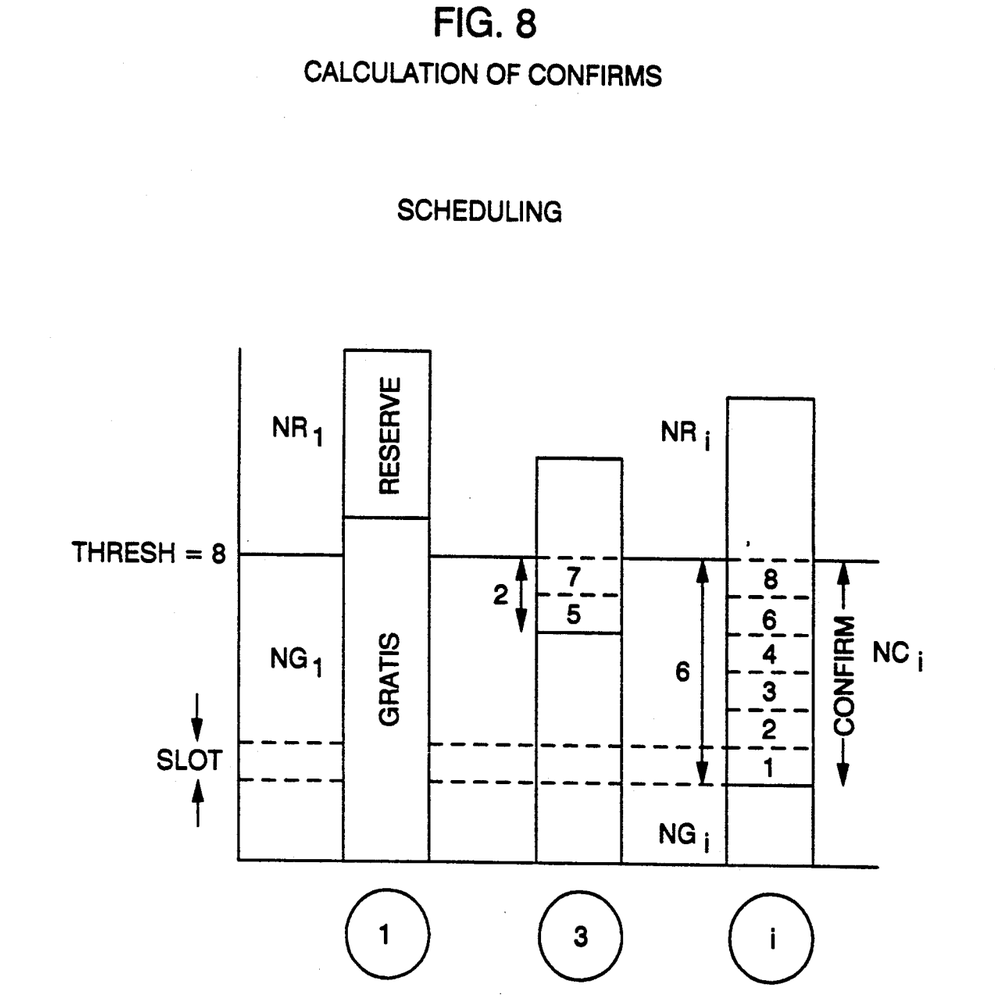
FIG. 8 illustrates the calculation of confirm counts from received reserve counts and gratis counts, for the example of the reserve and confirm commands shown in FIG. 6.

FIG. 8 schematically shows the computation of the slot grants, i.e. the confirm numbers, in the scheduler. Input data for this process are the reserve counts NR and the gratis slot counts NG received with the returning Reserve command, and a threshold value H. This threshold can be a fixed value or a value which is adapted in response to current traffic situations. It determines the maximum number of reserved slots that may be granted (confirmed) by the scheduler in a single round. For the present example, a threshold H=8 slots is assumed. This number will of course be much higher in a system with hundreds of nodes.

For each involved node, i.e. for each reserve request received with the Reserve command, the scheduler establishes three counts including count values $NR_i$ and $NG_i$ as received, and a third count $NC_i$. Counts NR and NG are initially set to the respective received values, and count NC is reset to zero. Slot confirmations are determined in a step-by-step procedure, each step including the following operations:

A) Successively for each established count group (i.e. for the count groups of three nodes in present example):
1. Decrease count $NG_i$ by one (if not yet zero);
2. If $NG_i$ already zero, decrease $NR_i$ by one (if not yet zero);
3. If $NR_i$ was decreased by one, increase count $NC_i$ by one (i.e. add one slot confirmation for node i).

B) Commonly for all count groups involved:
1. Add the sum of slot confirmations of the respective step (i.e. the number of nodes for which one slot confirmation was made in part A of that step) to a common accumulated confirmation count NC_ACC).
2. Determine, whether NC_ACC<THRESHOLD (i.e. whether total number of slot confirmations granted so far to the different nodes involved is still below threshold), and whether any $NR_i>0$ (i.e. whether there are still unconfirmed reservation requests).

If true, perform another step with operations A1 ... A3 and B1 ... B2.

If false (i.e. threshold already reached or all requests satisfied), shift the values of all $NC_i$ counts into a FIFO register for subsequent insertion into a Confirm command.

To resume:

For calculating the confirm numbers, the scheduler applies a simple additive algorithm. Involved nodes get assigned slot confirmations in a stepwise manner whereby the sum of gratis slot count and reserve count for each node is decreased by one in each step (provided this sum is positive). As long as a node has a gratis part, its confirm number remains zero. Thus, confirm numbers only increase during decrement of the reserve part. A new assignment step is started if the sum of the granted reservations is below threshold H and some nodes still have reservation requests. (The values given in FIG. 8 correspond to the reserve/gratis counts of the example in FIG. 6).

Principal Operation in the Scheduler

In the scheduler an arriving Reserve command is input into a FIFO store. Every of its reserve fields (ADUs) is entered into a respective NR/NG counter pair. The end delimiter of the Reserve command indicates the end of all reservations and triggers the start of the calculation of confirm numbers which is performed as previously described. Confirm numbers NC for the individual nodes are transferred into an output FIFO and are finally returned to the nodes in a Confirm command.

5) Operations on Slots and Slot Conversions in Nodes and Scheduler

Depending on the status of a node (i.e. whether it has data waiting for transmission and whether it has a confirmed number of slots), and on the status of an arriving slot (gratis/reserved, busy/free) different operations on and conversions of a slot will occur. These various operations and their conditions are shown in Tables 1A ... 1C below. The tables also show the adaptation of counter contents after the respective operations.

TABLE 1A

| Slot type changes when slot becomes free | |
|---|---|
| free slots | no operation |
| $BG \rightarrow FG$ | busy gratis becomes free gratis |
| $BG_s \rightarrow FG$ | busy gratis (synchronous) becomes free gratis |
| $BR_i \rightarrow FR_i$ | busy reserved (priority i) becomes free reserved (priority i) |
| $BRT \rightarrow FR_s$ | busy reserved with transfer becomes free reserved (synchronous) |

TABLE 1B

| Waiting for synchronous slot transmission | |
|---|---|
| Busy slots | no operation |
| $FR_s \rightarrow BG_s$ | access if $NR_s > 0$, with $NR_s = NR_s - 1$ |
| $FG \rightarrow BG_s$ | access, with $NG_s = NG_s + 1$ |
| Waiting for asynchronous slot transmission for priority i | |
| Busy slots | no operation |
| $FR_i \rightarrow BG$ | access if $NR_i > 0$, with $NR_i = NR_i - 1$ |
| $FG \rightarrow BG$ | access, with $NG_i = NG_i + 1$ |

TABLE 1C

| Slot type changes at scheduler: synchronous slot marking | |
|---|---|
| Reserved slots | No operation |
| $FG \rightarrow FR_s$ | free gratis becomes free reserved (synchronous) |
| $BG \rightarrow BRT$ | busy gratis becomes busy reserved with synchronous-transfer bit set |
| $BG_s \rightarrow BR_s$ | busy gratis (synchronous) becomes busy |

TABLE 1C-continued reserved (synchronous)

Slot type changes at scheduler:
asynchronous slot marking (priority i)

| Reserved slots | No operation |
|---|---|
| FG→FR$_i$ | free gratis becomes free reserved (priority i) |
| BG→BR$_i$ | busy gratis becomes busy reserved (priority i) |

Following designations are used in these Tables 1A . . . 1C and later in FIGS. 9 and 10A . . . 10C: FR=Free Reserved, FG=Free Gratis; BR=Busy Reserved; BG=Busy Gratis. The index "i" indicates a respective priority level for the slot, and the index "s" indicates that the slot is only for synchronous traffic. The scheduler will mark its slot reservations respectively. Gratis slots are always asynchronous and have no priority indication.

Figures 10, 10A:
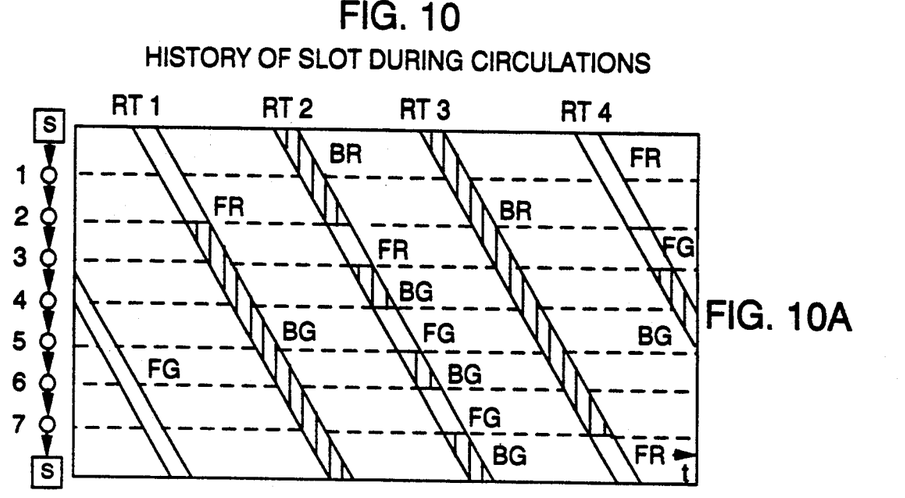
Figure 10B:
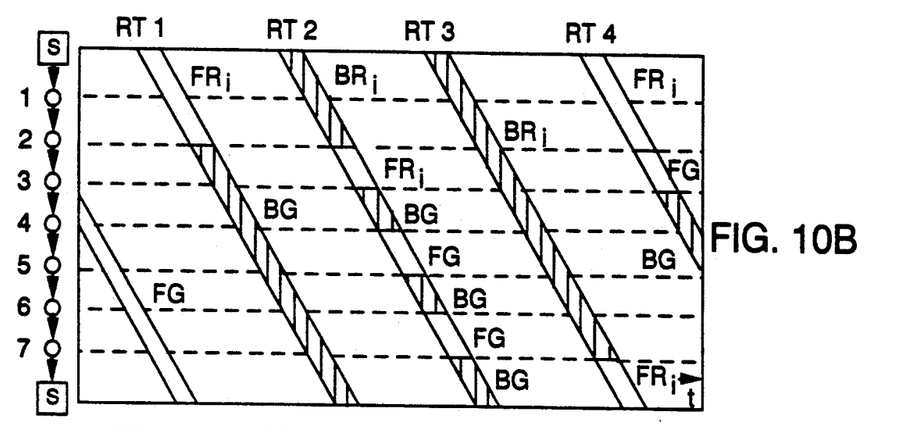
Figure 10C:
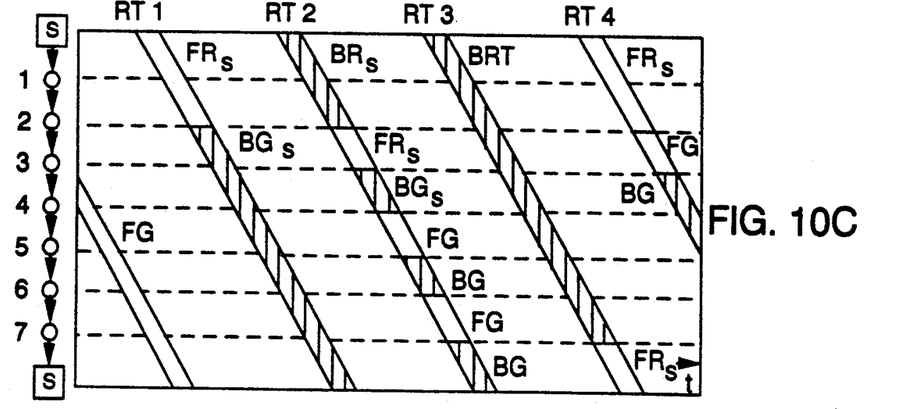

The tables are self-explaining and can well be understood in connection with FIGS. 10A . . . 10C and the explanation given in following section 6.

6) Circulation of a Slot on the Ring and Possible Conversions

Each individual slot, when travelling around the ring, can assume several states and can be converted many times. This is basically illustrated in FIG. 9. A more detailed illustration of the conversions of a travelling slot is given in FIGS. 10A . . . 10C.

Figure 9:
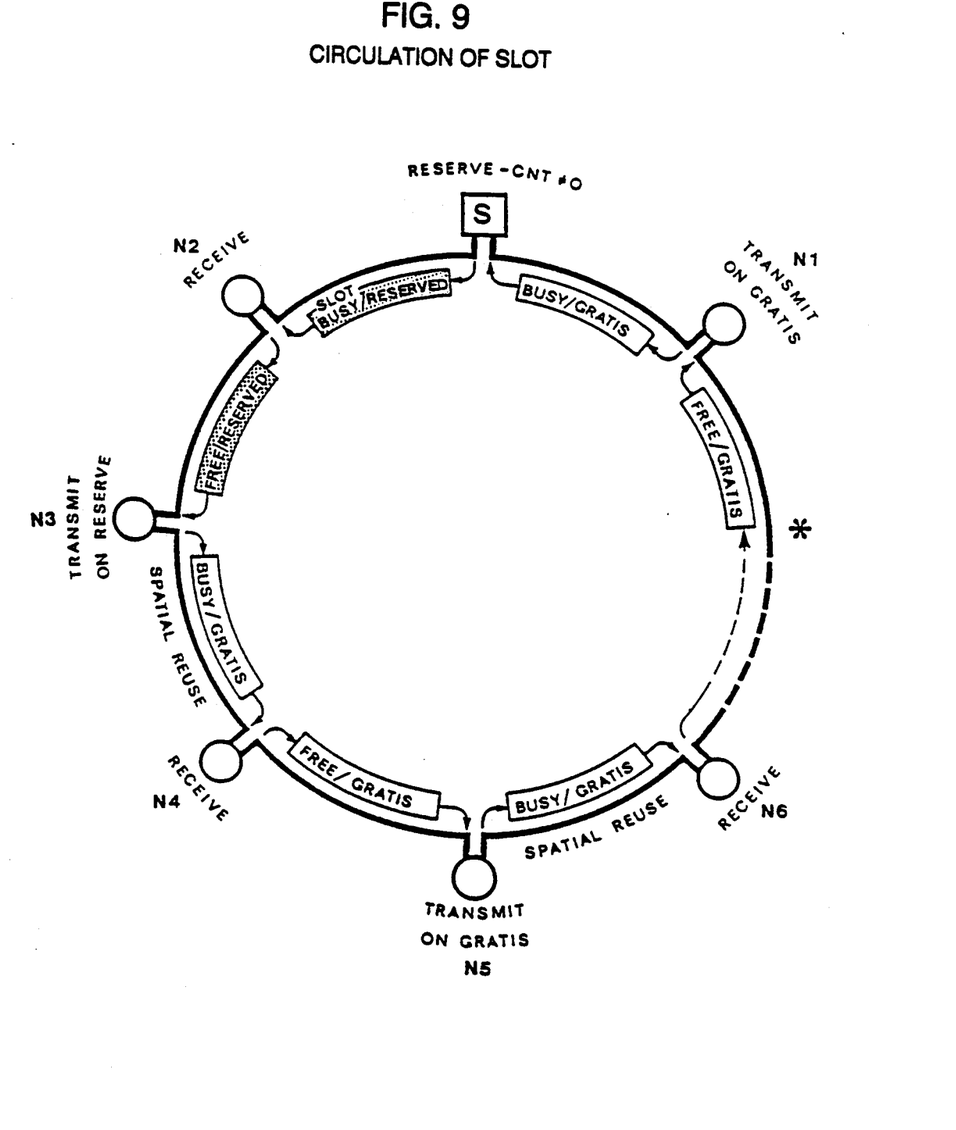
FIG. 9 shows an example of status modifications of a slot during its circulation around the ring.

FIG. 9 shows a ring with a scheduler and six nodes N1 . . . N6. Starting at a point marked by an asterisk, a free and gratis slot arrives at node N1. This has data to transmit and will use that slot, converting it to busy but leaving the gratis indication. When the slot passes the scheduler, it must be left busy (assuming the data it carries are destined for node N2 further downstream), but the scheduler, which still has to mark reserved slots for the current round, converts the slot to reserved (for later use by a node which had previously made a reservation which was confirmed). When the slot arrives at N2, data have reached their destination and the slot can be set free, but the reserved status will be kept. Thus, a free but reserved slot arrives at N3 which is assumed to have data for transmission and to have still a confirmed slot number. When N3 uses the slot by entering its data, it converts the indications to busy and to gratis (because the confirmed reservation now has been served). Assuming the data were destined for N4, this node will receive them and set the slot to free (gratis remains). Then any node further downstream, e.g. node N5, can use it for transmission of data, setting the indicators to busy but leaving the slot gratis. When the data then reach their destination, e.g. at N6, the slot can again be converted to free and will also remain gratis.

This history of a slot shows that during a single circulation, one slot may carry independent data several times, e.g. from three sources to three destinations, despite the fact that it was reserved only for one of these transmissions. The additional transmissions in gratis slots are taken into account in the reservation process of the next round. This is the reason for the effective and fair operation of the system when present invention is used.

FIGS. 10A . . . 10C each show several consecutive circulations of a slot around the ring with various conversions. The first FIG. 10A shows the principles without considering several classes of slots (all slots being equal). FIG. 10B shows the slot history when several different priorities are provided (each designated by "i"), where each priority has its own reservation mechanism. In FIG. 10C, there is shown a slot history where slots can be designated as either asynchronous (traffic which can be delayed in insertion buffers) or synchronous (traffic which is directly forwarded in each node, cf. FIG. 4 and respective text explaining the node structure).

The figures are time-space diagrams. For this example, it is assumed that the system has seven active nodes N1 . . . N7, each represented by a horizontal line in the drawings. In each drawing, the history of a single slot is shown in several roundtrips each from the scheduler output around the ring back to the scheduler input. Each slot roundtrip is marked in the drawings by "RTn" for reference purposes.

1) Slot Usage Trace for Slot Reservations

FIG. 10A illustrates the basic slot-type changes of a slot. Initially, a free gratis slot (FG) is considered. On its network roundtrip 1, the scheduler marks it free reserved (FR), and thus the slot becomes part of the reserved round. As it arrives at node 2 with confirmed reservations, the slot becomes busy gratis (BG). Now, on roundtrip 2 the scheduler marks it busy reserved (BR), so that as soon as the slot becomes free it is accessible only by nodes with reservations. Thus after being freed (at node 2), the slot is then of type free reserved (FR). Node 3 with confirmed reservations uses it and changes it again to busy gratis (BG). It becomes free gratis (FG) at destination node 4. Now two other nodes use the gratis slot consecutively and it passes the scheduler as busy gratis (BG). At the beginning of roundtrip 3 the slot is therefore marked busy reserved (BR) and then becomes free reserved (FR) at node 7 receiving the data. It passes the scheduler unchanged at the beginning of roundtrip 4 because it is reserved already. Node 2 which still has a confirmed reservation but no more data to send (because it had used a gratis slot) converts the slot from reserved (FR) to gratis (FG) so that it can be used by node 3 even if it had no more confirmed reservations. At the beginning of further roundtrips 5 and 6 (not shown), slots do not change their type at the scheduler because it is assumed here that the scheduler finished slot marking (i.e. current length counter CL=0) and the Confirm command starting the next round has not been sent out yet.

2) Slot Usage Trace for Priority Slot Reservations

In FIG. 10B, the corresponding slot-type changes of a priority slot reservation is shown. It is the same example as in FIG. 10B except that now the scheduler sets the priority number i into the slot when it marks a gratis slot as reserved. 3) Slot Usage Trace for Synchronous Slot Reservation Next, FIG. 10C shows slot-type changes for synchronous slot reservations. Note that when the slot is of type synchronous it by-passes insertion buffers. Initially, the considered slot is free gratis (FG). At the begin of roundtrip 1, the scheduler marks it as free reserved synchronous (FR$_S$). When it is used by node 2 with reservations for synchronous slots the slot type changes to busy gratis synchronous BG$_S$. At the beginning of roundtrip 2, the scheduler makes it busy reserved synchronous BR$_S$. When the data arrive at their removal point (node 2) it is made free reserved synchronous FR$_S$. Then it is again used by node 3 having a synchronous reservation and converted to busy gratis synchronous BG$_S$ and later changes (at node 4) to free gratis (FG). A node with asynchronous traffic demand makes it busy gratis (BG) and as it passes the scheduler at the beginning of roundtrip 3 the slot is marked as busy reserved with the synchronous-transfer bit set (BRT). This is done because the slot cannot be made synchronous immediately since otherwise it would start to bypass the insertion buffers. However, when the asynchronous slot becomes free (at node 7), the node changes the slot-type to free reserved synchronous (FR$_S$).

Despite of the fact that a slot changes between several slot types (indicated by a free/busy bit, reserved/gratis bit, synchronous-transfer bit, asynchronous/synchronous bit, and three bits for priorities), the hardware implementation for slot-type changes are rather simple operations with a linear translation whereby a multiple-input type relates to single-output type.

7) Alternatives

In the above description, one specific and preferred embodiment was disclosed. For some of the features, alternative solutions or applications are possible. They will be briefly explained in this section.

7a) Other Mechanism to Transfer Reserve and Confirm Information

In the described embodiment, the transmission of Reserve and Confirm commands was achieved by a special signalling procedure using the insert and remove principle. This appears to be the most effective way of reservation signalling.

However, the signalling information to be transferred, i.e. the reserve counts and gratis slot counts from nodes to scheduler, and the confirm counts from scheduler to nodes, can be conveyed in another manner. One could use, e.g., regular slots payload of highest priority for reservation signalling. Also, a signalling section or field could be provided in each normal slot header, and the reservation information would have to be entered into a number of successive slots following the slot carrying the start-of-reserve flag (or start-of-confirm flag respectively).

7b) Dual Bus System/Folded Bus System

As was mentioned already, the invention cannot only be used in ring-structured communication systems, but also in any other system in which the information is transferred sequentially from node to node and then can return to the scheduler. Examples of such systems were described in above-mentioned European patent applications EP-A-0,388,574 and EP-A-0,393,293.

7c) Other Timing of Rounds

In the embodiment described, a new reserve command is issued as soon as the last slot marked reserved has left the scheduler, i.e. when the length count CL has become zero (assuming that then new reservations will be required anyway). However, other rules for issuing the reserve commands can well be used.

E.g., reserve commands could be issued at regular intervals, which would mean however that possibly the current length count CL in the scheduler (which indicates how many reserved slots have still to be released because they were confirmed already) would not yet be zero in some instances. Thus, the fixed timing of reserve commands should be restricted to situations when the traffic volume is low. It would also be possible to vary this interval in dependence of the number of free gratis slots which pass the scheduler.

7d) Other Algorithms for Computing Confirmations

One algorithm for calculating the confirm counts in response to a received reserve command was explained in connection with FIG. 8. There are of course numerous other possibilities to process the reserve counts and gratis counts for determining the confirm count for each node making a request.

An alternative method would be e.g. to determine the confirm count for each node in dependence of the ratio between the reserve count and the gratis count (thus admitting that a highly active node would be allowed to use relatively more gratis slot. Another possibility is to grant to each requesting node a minimum number of confirms and then deduct the gratis count from the remaining reserve count.

In any case, the availability of the gratis slot use count for each node demanding further slot grants, which is enabled by this invention, is a valuable input for any suitable confirm algorithm that might be selected.

The invention claimed is:

1. Communication system comprising a scheduler (15) and a plurality of nodes (13) connected to a circulating sequential transmission medium (11), data being transmitted on said medium in time slots (17), said scheduler having means to issue time slots marked (31) either as reserved for use only by nodes having confirmed slot reservations, or as gratis for free use by any node, and each node having means to convert the marking of a reserved slot to gratis to allow reuse of that slot; said communication system further characterized by each node having means (65) for keeping a count (NW) of slots required for transmission and means (67) for keeping a count (NG) of gratis slots used;

said scheduler having means for issuing a reserve command into which each node requiring slots for transmission can enter a separate reservation;

each node having means to enter into said reserve command as reservation, said count of required slots as reserve count (NR) and said count of gratis slots used as gratis count (NG);

said scheduler having means for evaluating a reserve command returning after circulation, and for determining the number (NC) of slots to be granted to each requesting node in dependence of the respective node's reserve count (NR) and gratis count (NG) received with said reserve command.

2. Communication system according to claim 1, characterized by said scheduler having means to issue a confirm command comprising a separate confirm field for each node having made a reservation in said reserve command, and for inserting said numbers of slots to be granted determined by said evaluating means, into said separate confirm fields as confirm counts (NC), and each said node having means for storing a confirm count (NC), and for extracting a confirm count from said confirm command and for inserting it into said confirm count storing means (69).

3. Method of requesting and granting the use of transmission slots in a communication system comprising a scheduler (15) and a plurality of nodes (13) connected to a circulating serial transmission medium (11), said transmission slots (17) having a given format, each slot including a field (31) for marking it as reserved for use only by nodes having a granted reservation, or as gratis for use by any node, characterized in that it includes the following steps
- at each said node keeping a count (NW) of slots required for transmission, and a count (NG) of gratis slots used,
- at said scheduler issuing a reserve command into which each node for requesting slots, inserts its number of required slots as reserve count (NR) and the number of gratis slots used as gratis count (NG),
- said scheduler, when receiving the circulated reserve command, determines the number (NC) of slots to be granted to each requesting node by evaluating each reserve count (NR) and the associated gratis count (NG), and thereafter issuing a confirm command for transferring each said determined number (NC) of slots to be granted, as confirm count to the respective node.

4. Method according to claim 3, characterized in that said scheduler
- after issuing a reserve command, marks passing slots as gratis; then
- after having received back the circulated reserve command and having determined the repective confirm counts, issues a confirm command and then marks a number of passing slots as reserved which corresponds to the sum of all confirm counts transmitted in the confirm command; and
- thereafter issues the next reserve command.

5. Method according to claim 3, characterized in that any node, when using a free reserved slot for transmission of data, converts the marking of said slot from reserved to gratis and additionally marks it as busy, and that
- the destination or removal node when receiving the data transmitted in said slot marks the slot as free,
- so that the slot can be used by any further node as gratis slot for data transmissions despite its previous marking as reserved.

6. Method according to claim 3, characterized in that any node still having a non-zero confirm count but having no more data to be transmitted, converts the marking of a passing free reserved slot into gratis, and decreases its confirm count by one.

7. Method according to claim 3, characterized in that
- said reserve command is issued by said scheduler by transmitting a start flag followed by an end flag;
- each node for making a reservation, inserts an additional reserve field containing its reserve count and gratis count, between the start and end flag;
- the scheduler issues each confirm command as a sequence of start flag, confirm fields, and end flag, the number of said confirm fields corresponding to the number of reserve fields received with the associated reserve command,
- and that each node which has previously requested slots by inserting a reserve count into the reserve command, removes one confirm field from the confirm command and receives the confirm count contained therein.

8. Method in accordance with claim 3, characterized in that
- different transmission priorities are provided in the communication system, that
- for each priority, the scheduler issues respective reserve and confirm commands, and that
- each node maintains a separate count of required slots and of gratis slots used, for each of the transmission priorities it requires.

9. Method according to claim 3, characterized in that the scheduler determines the confirm counts in response to a received reserve command such that
- for each requesting node, the sum of the gratis count and of the confirm count does not exceed a value common to all nodes,
- for each requesting node, the confirm count is not greater than the node's reserve number, and
- the sum of the confirm counts for all requesting nodes is not greater than a predetermined threshold value. R

* * * * *